(12) United States Patent
Thrien

(10) Patent No.: US 11,551,882 B2
(45) Date of Patent: Jan. 10, 2023

(54) PUSH SWITCH AND MOTOR VEHICLE HAVING A PUSH SWITCH

(71) Applicant: Volkswagen Aktiengesellschaft, Wolfsburg (DE)

(72) Inventor: Markus Thrien, Gladbeck (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/312,328

(22) PCT Filed: Nov. 14, 2019

(86) PCT No.: PCT/EP2019/081396
§ 371 (c)(1),
(2) Date: Jun. 9, 2021

(87) PCT Pub. No.: WO2020/126245
PCT Pub. Date: Jun. 25, 2020

(65) Prior Publication Data
US 2022/0028629 A1 Jan. 27, 2022

(30) Foreign Application Priority Data
Dec. 18, 2018 (DE) ............. 10 2018 222 088.3

(51) Int. Cl.
*H01H 3/12* (2006.01)
*B60K 35/00* (2006.01)
(Continued)

(52) U.S. Cl.
CPC ............ *H01H 3/125* (2013.01); *B60K 35/00* (2013.01); *B60K 37/06* (2013.01); *H01H 9/181* (2013.01);
(Continued)

(58) Field of Classification Search
CPC ........ H01H 3/125; H01H 9/181; B60K 35/00; B60K 37/06; B60K 2370/131; B60K 2370/145; B60K 2370/128
(Continued)

(56) References Cited

U.S. PATENT DOCUMENTS

| 6,091,036 A | 7/2000 | Hu .............................. 200/344 |
| 8,446,069 B2 | 5/2013 | Monig et al. ................. 310/328 |

(Continued)

FOREIGN PATENT DOCUMENTS

| CN | 2800464 Y | 7/2006 | ............. H01H 13/14 |
| DE | 29918540 U1 | 1/2000 | ............... H01H 3/12 |

(Continued)

OTHER PUBLICATIONS

German Office Action, Application No. 102018222088.3, 5 pages, dated Oct. 11, 2019.
(Continued)

*Primary Examiner* — Edwin A. Leon
*Assistant Examiner* — Iman Malakooti
(74) *Attorney, Agent, or Firm* — Slayden Grubert Beard PLLC

(57) ABSTRACT

A push switch and a motor vehicle in which such a push switch is used. The push switch has a push cap, a baseplate, a switch element which is actuatable by the push cap, a first lever, and a second lever. The first lever and the second lever are mounted rotatably on the baseplate by means of bearing blocks and are each connected movably to the push cap at a first lever end. At a second lever end, the first lever and the second lever are connected movably to one another. The first lever and the second lever are designed such that they form mass compensation for the push cap.

20 Claims, 7 Drawing Sheets

(51) Int. Cl.
*B60K 37/06* (2006.01)
*H01H 9/18* (2006.01)

(52) U.S. Cl.
CPC .. *B60K 2370/128* (2019.05); *B60K 2370/131* (2019.05); *B60K 2370/145* (2019.05); *B60K 2370/1438* (2019.05); *H01H 2219/002* (2013.01); *H01H 2231/026* (2013.01)

(58) Field of Classification Search
USPC .......................................................... 200/341
See application file for complete search history.

(56) References Cited

U.S. PATENT DOCUMENTS

| | | |
|---|---|---|
| 9,449,772 B2 | 9/2016 | Leong et al. |
| 10,229,795 B2 | 3/2019 | Fust et al. |
| 10,832,876 B2 | 11/2020 | Thrien et al. |
| 2008/0185279 A1 | 8/2008 | Lin ............... 200/344 |
| 2012/0038562 A1 | 2/2012 | Holman, IV et al. ........ 345/173 |
| 2012/0103773 A1 | 5/2012 | Villain ........... 200/344 |
| 2013/0194210 A1 | 8/2013 | Pfau et al. .................. 345/173 |
| 2020/0079416 A1* | 3/2020 | Intini ................... B62D 1/046 |
| 2022/0028629 A1* | 1/2022 | Thrien .................. B60K 35/00 |

FOREIGN PATENT DOCUMENTS

| | | | | |
|---|---|---|---|---|
| DE | 102005049848 | * | 4/2007 | .............. B60Q 5/00 |
| DE | 102005049848 A1 | | 4/2007 | .............. B60Q 5/00 |
| DE | 102007040604 A1 | | 12/2008 | .............. B60R 16/02 |
| DE | 112013005212 T5 | | 8/2015 | .............. G06F 3/02 |
| DE | 102016123411 A1 | | 6/2018 | .............. G05G 1/02 |
| DE | 102017220780 A1 | | 2/2019 | .............. B60R 16/02 |
| DE | 102018222088 B3 | | 6/2020 | .............. B60K 37/06 |
| WO | 2008/152457 A1 | | 12/2008 | .............. G06F 3/033 |
| WO | 2015/086589 A1 | | 6/2015 | .............. B60K 37/06 |
| WO | 2016/012277 A1 | | 1/2016 | .............. G06F 3/01 |
| WO | 2020/126245 A1 | | 6/2020 | .............. B60K 35/00 |

OTHER PUBLICATIONS

International Search Report and Written Opinion, Application No. PCT/EP2019/081396, 18 pages, dated Feb. 10, 2020.

* cited by examiner

PUSH SWITCH AND MOTOR VEHICLE HAVING A PUSH SWITCH

CROSS-REFERENCE TO RELATED APPLICATIONS

This application claims priority to German Patent Application No. DE 10 2018 222 088.3, filed on Dec. 18, 2018 with the German Patent and Trademark Office. The contents of the aforesaid Patent Application are incorporated herein for all purposes.

TECHNICAL FIELD

The present invention relates to a push switch and to a motor vehicle in which a push switch is installed.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In modern interior design of motor vehicles, there is an increasing necessity to install relatively large and often heavy elements at a variety of positions in the motor vehicle, which elements should also serve simultaneously as push switches. For example, push switches may be provided in the form of touchscreens, displays, or buttons in the center console, the steering wheel, the doors, the ceiling, or the dashboard with which the vehicle occupants can trigger a desired function with a touch of a finger. It is desirable here for the necessary actuation forces to remain basically the same regardless of the pressure point on the surface of the push switch. For reasons of cost, it is also sought after for the push switches to only have one sensor or element for haptic feedback.

Solutions used for computer keyboards cannot carry large loads such as, for example, 5-inch displays. In addition, larger surfaces begin to tilt such that, with keys like the space bar, the shift key, or the enter key, a shift of the keys perpendicular to the direction of actuation is often visible and sometimes multiple switch elements are required for them to be triggered reliably.

A challenge in the development of large-format push switches is that a large, heavy surface must be mounted such that the push switch can be installed anywhere in the motor vehicle, for example in the center console, the doors, the ceiling, or the dashboard. At the same time, nearly identical actuation forces should always be measurable on the surface during actuation of the push switch regardless of the installation location. In particular when a display is integrated into the push switch, malfunctions or reduced operability can occur due to the additional mass of the display, depending on the installation location.

Further problems can occur when the push-button switch is installed in the motor vehicle such that its direction of actuation is parallel to the direction of travel. Due to acceleration or braking maneuvers, the display experiences acceleration that can lead to movements on the display. A comparable problem occurs when the push-button switch is installed in the center console or in the ceiling and an uneven path is driven. The vibrations occurring in this case propagate through the relatively weakly damped system to the display. In both cases, erroneous triggerings of the switching element can occur.

With lightweight displays or key caps, these effects do not appear since swinging up can be prevented through slight pretensioning of the system and the play in the system can be reduced. Depending on the desired triggering force of the push switch, it must only be ensured that the forces occurring as a result of the acceleration are smaller than the triggering force of the push switch.

SUMMARY

An object exists to provide an alternative structure of a push switch that is suitable for a large-area design and integration of a heavy display.

The object is solved by a push switch with the features of claim 1. Embodiments of the invention are the subject matter of the dependent claims and the following description.

DESCRIPTION

Figure 1:
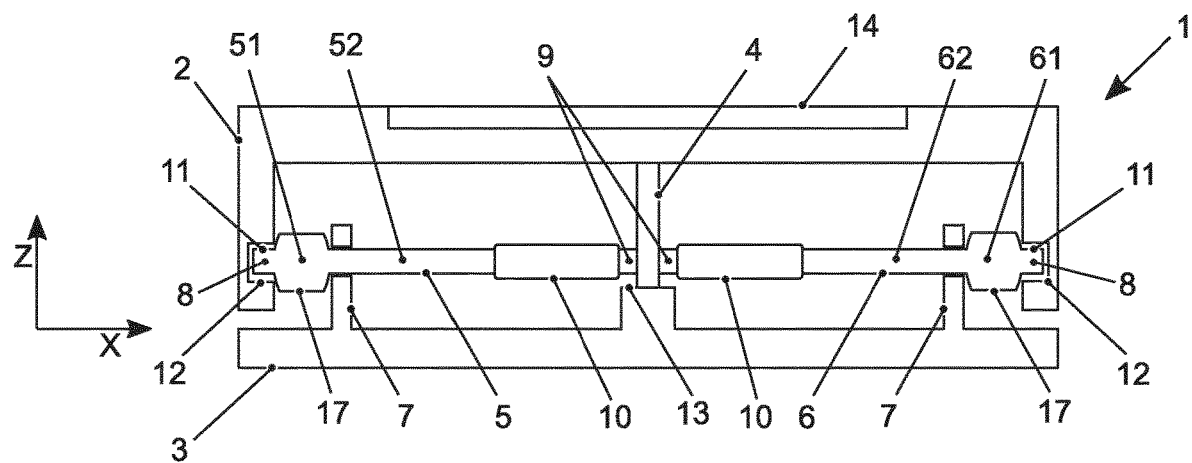
FIG. 1 shows a simplified schematic representation of a side view of an embodiment of a push switch in a resting position.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

According to a first exemplary aspect, a push switch has a push cap, a baseplate, a switch element which is actuatable by the push cap, a first lever, and a second lever, wherein the first lever and the second lever are mounted rotatably on the baseplate by means of bearing blocks, are each connected movably to the push cap at a first lever end and are connected movably to one another at a second lever end, and wherein the first lever and the second lever are designed such that they form mass compensation for the push cap.

The present construction enables a very flat structure of large push switches which can support, for example, a display and function with low triggering forces. The push switches are constructed very simply, cost effective since the two levers can be structurally identical, and at the same time robust against overload. The movable push cap is positioned very well in its resting position via the lever mechanism. In addition, twisting of the movable push cap relative to the direction of actuation may be effectively prevented. In addition, as a result of the lever mechanism and in some embodiments, just one central switch element is required to make a large surface into a push switch. The construction can be installed in any position and functions, even when installed overhead, with nearly the same triggering force without further tuning of the system. The switching function is impervious to additionally occurring accelerations, regardless of their direction. A widely available element may be used as the switch element, for example one of the following elements: a dome switch, a piezo element, an electromagnet, or a vibration element. The solution according to the some embodiments needs only one central switch element for the haptic feedback. To detect a force, this may be, for example, a dome switch, as it is known from computer keyboards. For force feedback, a stroke of the entire push cap counter to the direction of actuation can be generated by means of a piezo element or an electromagnet. For haptic feedback in the form of a vibration, the central switch element can be a vibration element.

In some embodiments, the bearing blocks are arranged such that the levers each have asymmetrical lever arms. The stroke of the push cap can be determined by the selection of the position of the mounting of the levers. Thus, the design of the push switch may be adapted to various applications. The non-identically long lever arms result in a series of benefits. Smaller compensation weights maybe used, as a result of which the required installation space is reduced. At the same time, the mass compensation for acceleration compensation leads only to a reasonable increase in the weight of the push switch. A reduced effect of the play between the lever ends, which are connected movably to one another, on the push cap deviation in the direction of actuation results as a further benefit.

In some embodiments, weights are arranged in or on the levers for mass compensation. Alternatively or additionally, the levers may each have an accumulation of material. The use of weights has the benefit that adding or removing weights enables an adaptation to push caps with different masses. However, an additional work step may be needed for installing the weights. This may be dispensed with if accumulations of material are used for mass compensation, for example thickenings of the lever arms.

In some embodiments, the levers are designed such that their respective centers of gravity are shifted in the direction of the second lever end. Experiments have shown that the mass compensation functions better the farther the centers of gravity of the levers are shifted in the direction of the center of the push switch, i.e., in the direction of the respective second lever end. The center of gravity should in this case lie in the center of the levers in the direction of actuation.

In some embodiments, the first lever end of the first lever and the first lever end of the second lever are connected to the push cap in a play-free manner in the direction of actuation of the push switch. The at least largely play-free connection ensures that the push cap moves with a nearly parallel shift in the direction of the baseplate. Deviations <0.1 mm can be realized in this direction. The position at which a touch of a finger on the push cap takes place does not play a role here.

In some embodiments, the second lever end of the first lever and the second lever end of the second lever are connected to one another by means of involute toothing. Involute toothing is a simple and cost-effective solution for a play-free and frictional connection between the levers in which the levers are in contact with one another at all times. Involute toothing has no additional movable or deformable parts. During assembly, the teeth of the lever ends must merely be put together such that simple assembly is ensured.

In some embodiments, contact surfaces between the levers and the push cap and between the levers and the bearing blocks are formed at least partially as cylindrical rolling surfaces. As a result of the rolling of the levers between the push cap and the bearing blocks of the baseplate instead of sliding, only rolling friction occurs, as a result of which, inter alia, the wear is reduced. In addition, nearly the entire force is transmitted to the switch element during actuation.

In some embodiments, the levers each have at least one driver which hooks into an associated recess in the push cap or the bearing blocks. In this manner, a simple and cost-effective solution for a play-free and frictional connection between the push cap and the levers or between the bearing blocks and the levers is realized. No complicated mechanical joints are required.

In some embodiments, the baseplate has a carrier surface for the levers that determines a resting position. The carrier surface achieves a defined height position of the push cap in the resting position, which is beneficial for an installation of the push switch that is flush with the surface.

In some embodiments, a display is arranged on the push cap. The display can be used to display variable contents on the push switch and thus adapt the push switch to different operating situations. For example, this also creates the possibility of providing large displays with haptic feedback.

In some embodiments, a push switch is used in a vehicle, in particular a motor vehicle. Such a push switch is suitable for practically all operating elements, for example in the ceiling region, in the doors, as a steering wheel button, for a navigation or multimedia system, the operation of the air conditioning system, etc. However, use is not limited to the area of vehicles; in principle, this push switch may be used anywhere where thin buttons, displays, or touchscreens are required and where at the same time haptic feedback is desired.

Further aspects will become apparent from the following description and the appended claims in conjunction with the FIGS.

In order to better understand the principles of the present invention, additional embodiments are explained in greater detail below based on the FIGS.. It should be understood that the invention is not limited to these embodiments and that the features described may also be combined or modified without departing from the scope as defined in the appended claims.

Specific references to components, process steps, and other elements are not intended to be limiting. Further, it is understood that like parts bear the same or similar reference numerals when referring to alternate FIGS. 1*t* is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a simplified schematic representation of a side view of a push switch 1 in a resting position. A section along the X-Z plane is shown, wherein Z is the direction of actuation of the push switch 1. The push switch 1 has a push cap 2, a baseplate 3, a switch element 4, a first lever 5, and a second lever 6. A display 14 is embedded in the push cap 2. In this example, the switch element 4 is a dome switch. The push cap 2 is movable, whereas the baseplate 3 is fixed at the installation location of the push switch 1. The switch element 4 is arranged between the push cap 2 and baseplate 3 such that it is actuatable by the push cap 2. The two levers 5, 6 are mounted rotatably in the Y-direction on the baseplate 3 by means of bearing blocks 7. For example, the two levers 5, 6 are fixedly positioned in the Z- and X-direction. The bearing blocks 7 are arranged such that the levers 5, 6 each have asymmetrical lever arms 51, 52, 61, 62. The levers 5, 6 each have a cylinder element 17 and are conditioned such that the cylinder element 17 can roll between the push cap 2 and the respective bearing block 7. In this case, the length of the long lever arms 52, 62 is for example at least three times as large as the diameter of the cylinder element 17.

The movable push cap 2 is movably connected to one first lever end 8 of the two levers 5, 6 at each of two opposite sides. For this purpose, the levers 5, 6 have drivers 11 that pass on the movement of the push cap 2 in the Z-direction to the cylinder element 17. The drivers 11 engage in corresponding recesses 12 in the push cap 2 for this purpose. The recesses 12 are designed such that there is hardly any play in the Z-direction. The cylinder elements 17 also have drivers (not shown here) on the opposite side that engage with the bearing blocks 7. The first lever 5 and the second lever 6 are movably interlocked with one another on a second lever end 9 such that a rotational movement is transferred from one lever to the other. For example, this connection is free of play in the Z-direction, for example by using involute toothing. The cylinder elements 17 on the short lever arms 51, 61 ensure that the push cap 2 is moved at a defined distance to the bearing blocks 7 and can roll on the vertical surfaces of the bearing blocks 7. Thus, only rolling friction arises.

The two levers 5, 6 have weights 10 that are arranged in or on the levers 5, 6. Alternatively or additionally, the weights 10 may also be realized in the form of an accumulation of material in the levers 5, 6, for example in the form of a thickening. The weights 10 are selected such that the levers 5, 6 are arranged nearly parallel to the push cap 2 without any actuation force on the movable push cap 2. Deviations in the order of magnitude of approx. 2° with respect to the baseplate 3 are acceptable since the entire system is pretensioned by the switch element 4 with approx. 0.2 N and the levers 5, 6 are thus pressed against a carrier surface 13. In the case of a dome switch, the pretensioning may be realized, e.g., in that a silicone element of the dome switch is compressed.

Depending on the selected play of the levers 5, 6 and of the push cap 2 in relation to each other, the push cap 2 in its resting position is positioned very well in X and Y by the lever mechanism. At the same time, the construction largely prevents twisting of the push cap 2 about the Z-axis. The levers 5, 6 serve here only for suspension and guidance as well as for mass compensation of the push cap 2.

Figure 2:
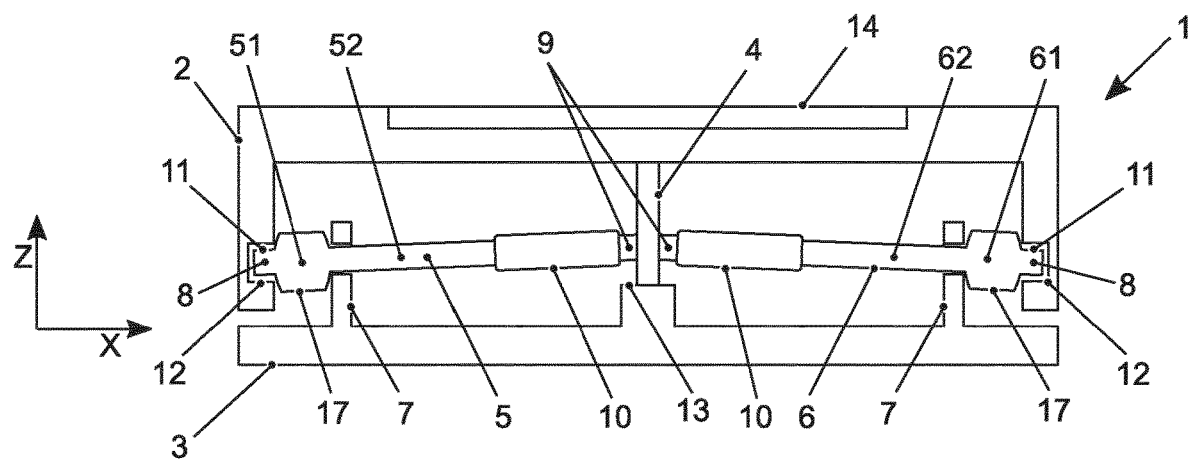
FIG. 2 shows the push switch from FIG. 1 in an actuation position.

FIG. 2 shows the push switch from FIG. 1 in an actuation position. If the push cap 2 is moved in the direction of the baseplate 3 as a reaction to an actuation force, the cylinder elements 17 on the levers 5, 6 roll in the direction of the baseplate 3. At the same time, the levers 5, 6 are set in rotation by the downward movement of the push cap, i.e. the lever ends 9, which are interlocked with one another, and the weights 10 move in the direction of the push cap 2. Along with the largely play-free mounting, the interlocking of the levers 5, 6 ensures that the push cap 2 moves relative to the baseplate 3 with a nearly parallel shift in the Z-direction, regardless of the position in X and Y at which a touch of a finger on the push cap 2 takes place. If the angles of the lever rotation have been selected to be small enough, for example smaller than 10°, the torques practically offset each other. In addition, the weights 10 arranged on the lever system then also only slightly increase the force necessary to actuate the switch element 4. As the actuation force of the user rises, the switch element 4 is increasingly compressed between the push cap 2 and the baseplate 3. It finally collapses when its triggering force has been reached, such that the contact is closed. The triggering force may lie, for example, in the range between 2 N and 6 N.

In the following, embodiments will be described in greater detail with reference to FIGS. 3 to 13.

Figure 3:
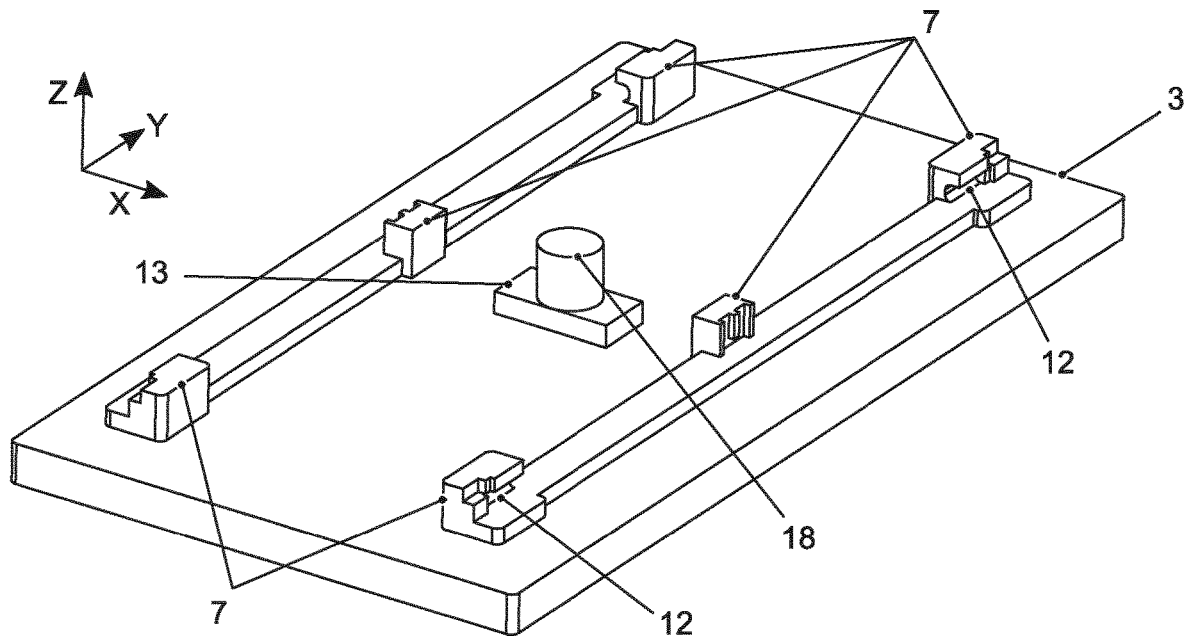
FIG. 3 shows a baseplate of an embodiment of the push switch.

FIG. 3 shows a baseplate 3 of an embodiment of the push switch. The coordinate system used is also shown. In this embodiment, three bearing blocks 7 are provided for each lever. The bearing blocks 7 are designed such that recesses 12 for drivers of the levers are formed. A centrally arranged support surface 18 for the switch element as well as carrier surfaces 13 for the two levers are also shown. The carrier surfaces 13 define a resting position.

Figure 4:
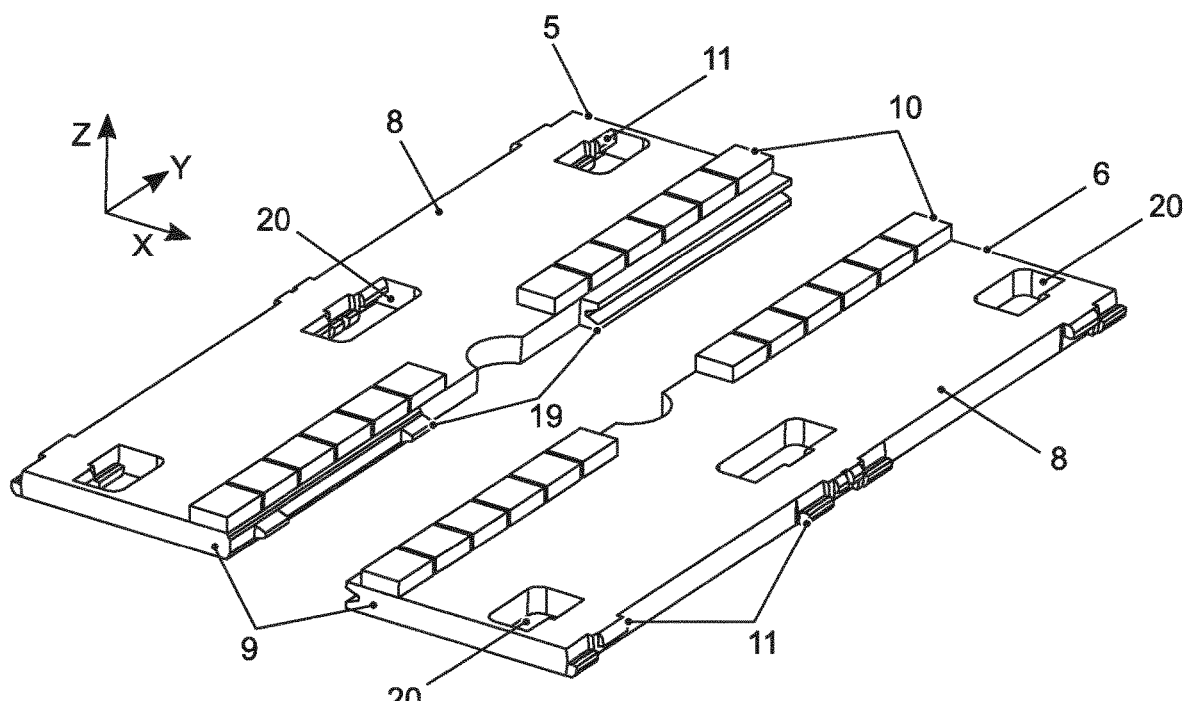
FIG. 4 shows a lever of an embodiment of the push switch.

FIG. 4 shows a lever pair of the embodiment of the push switch. In this embodiment, the first lever 5 and the second lever 6 are structurally identical, as a result of which production costs can be saved. On a first lever end 8, the levers 5, 6 have drivers 11, which, in the assembled state of the push switch, interact with corresponding recesses in the push cap and thus establish the movable connection to the push cap. On a second lever end 9, the levers 5, 6 have teeth 19, by means of which the movable, play-free connection between the levers 5, 6 is realized. Weights 10, for example made of metal, are attached to the levers 5, 6. These weights may be, for example, screwed or adhered to the levers 5, 6. The levers 5, 6 have openings 20 with which the bearing blocks engage. Drivers 11 are also arranged in the openings 20. The drivers interact with the bearing blocks in the assembled state of the push switch. The drivers 11 have cylindrical surfaces so that the drivers 11 can roll between the push cap and the bearing blocks.

Figure 5:
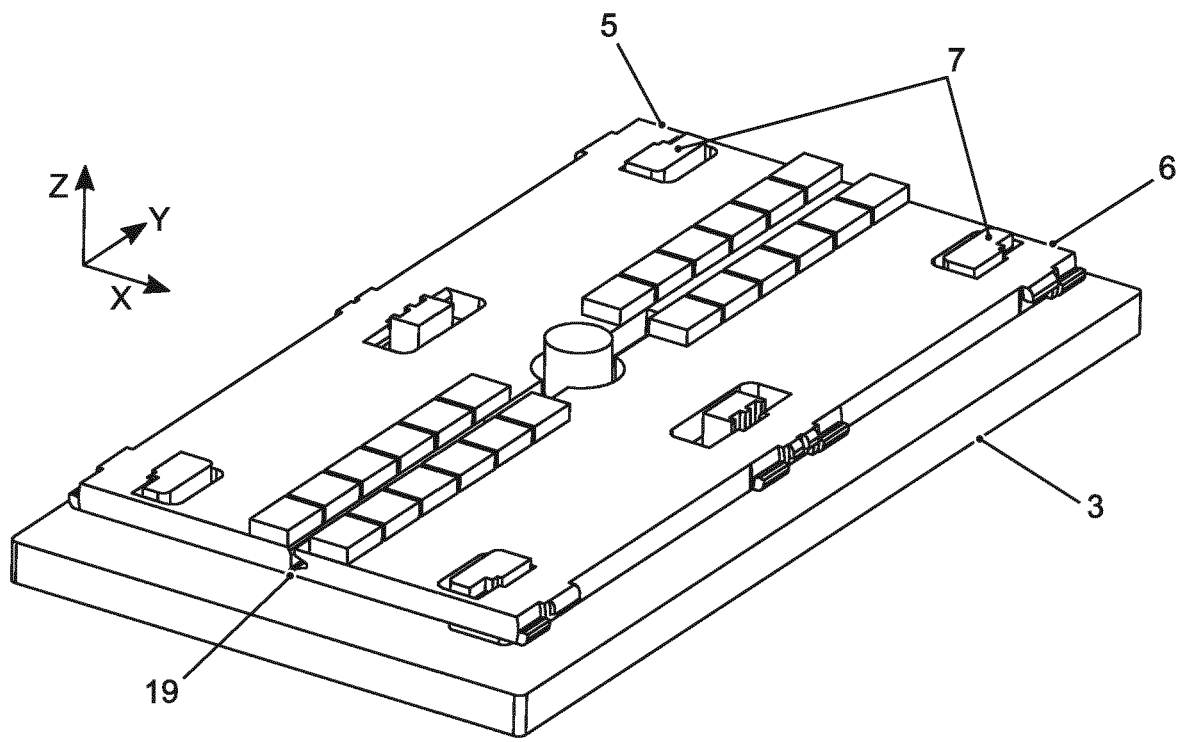
FIG. 5 shows the baseplate from FIG. 3 with the installed lever pair from FIG. 4.

FIG. 5 shows the baseplate 3 from FIG. 3 with the installed lever pair from FIG. 4. The levers 5, 6 lie on the bearing blocks 7 and are held in the recesses in the bearing blocks 7 by the drivers. In addition, the teeth 19 of the two levers 5, 6 engage with each other such that a frictional, movable connection between the levers 5, 6 exists.

Figure 6:
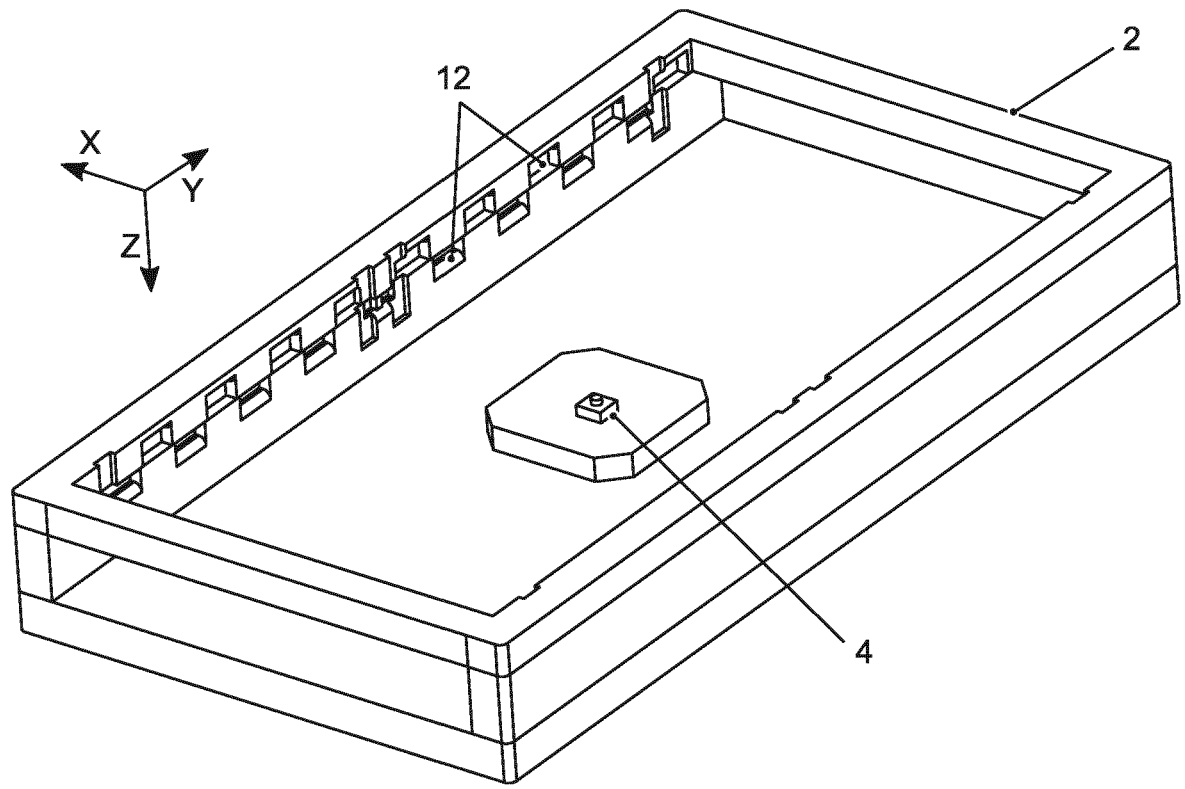
FIG. 6 shows a push cap of an embodiment of the push switch.

FIG. 6 shows a push cap 2 of the embodiment of the push switch. The push cap 2 is shown in a view from below, i.e. the push cap 2 has been rotated about the Y-axis by 180°. Recesses 12 that interact with the drivers at the respective first lever end of the levers and establish a movable connection to the levers are arranged on the long edges of the push cap 2. Furthermore, the switch element 4 is centrally arranged inside the push cap 2.

Figure 7:
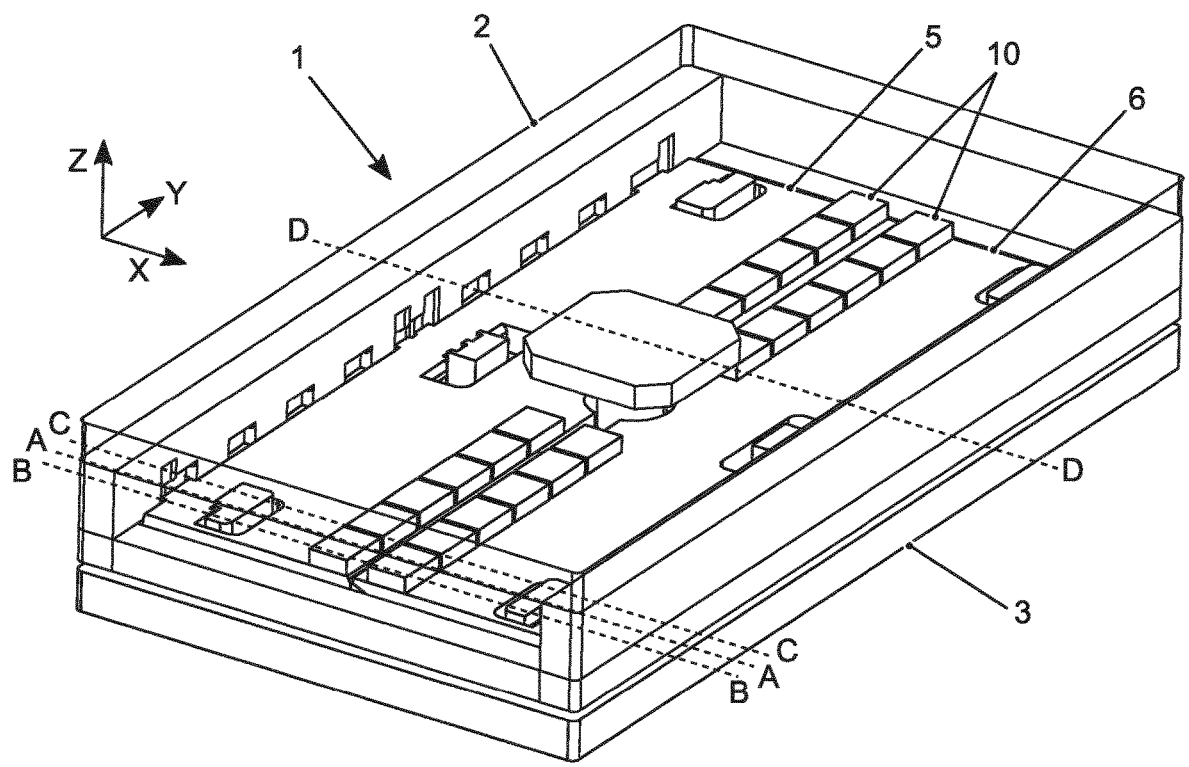
FIG. 7 shows an example of the fully assembled push switch.

FIG. 7 shows an example of the fully assembled push switch 1. In this example, the push cap 2 is shown transparent. In the assembled state, the push switch 1 has a width of 135 mm in the X-direction, a depth of 250 mm in the Y-direction, and a height in the resting position of 47.5 mm in the Z-direction. The height in the Z-direction for the lever mechanism takes up approx. 6 mm with a stroke of the push cap 2 of ~0.5 mm. With a total weight of the push switch 1 of 1700 g, the weight of the push cap is 770 g. In this case, twelve weights 10 to each 5 are arranged on each lever 5, 6. In addition, four sectional planes A-A, B-B, C-C, and D-D are marked in the figure and are shown in FIG. 8 to FIG. 12.

Figure 8:
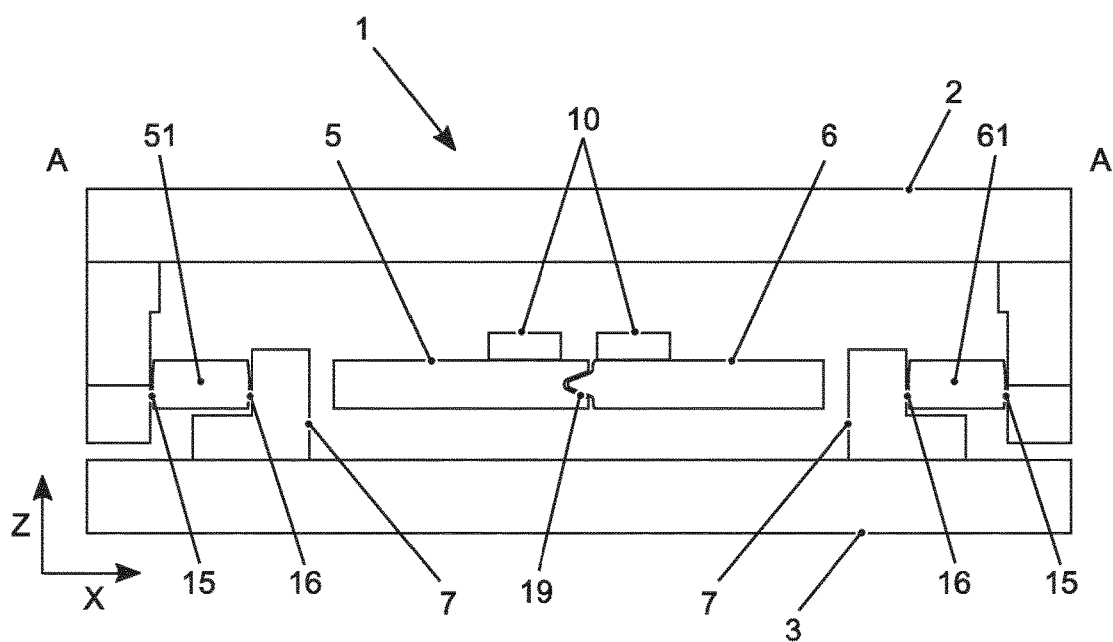
FIG. 8 shows a first section through the push switch from FIG. 7 along the X-Z plane.

FIG. 8 shows a first section through the push switch 1 from FIG. 7 along the X-Z plane in the region of the sectional plane A-A. In the representation shown, the section runs more or less through the center of the front bearing blocks 7. The cylindrical design of the short lever arms 51, 61 can be seen well. The resulting cylindrical running surfaces on the levers 5, 6 roll along the contact surfaces 15 with the push cap 2 and along the contact surfaces 16 with the bearing blocks 7 of the baseplate 3. These cylindrical running surfaces are present in all four corners of the construction. The teeth 19, formed as involute toothing, of the two levers 5, 6 engage with each other and thus form a movable, frictional connection between the levers 5, 6. This ensures that the push cap 2 cannot tilt during actuation.

Figure 9:
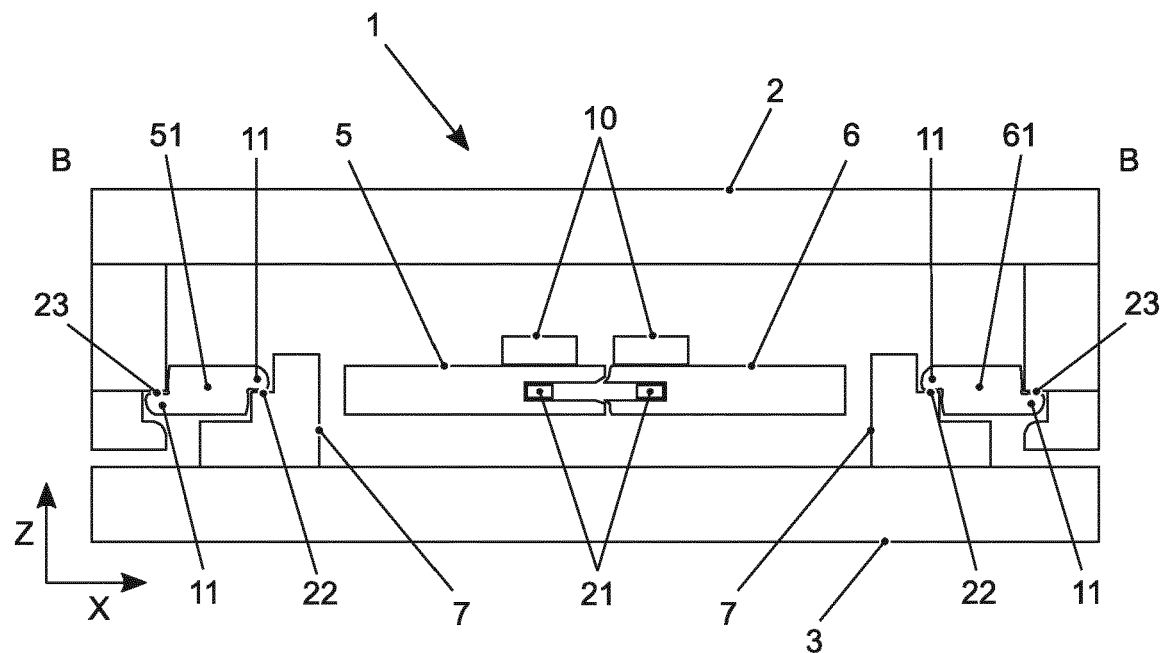
FIG. 9 shows a second section through the push switch from FIG. 7 along the X-Z plane.

FIG. 9 shows a second section through the push switch 1 from FIG. 7 along the X-Z plane in the region of the sectional plane B-B. In the representation shown, the section runs approximately through the front third of the front bearing blocks 7. The two levers 5, lie near the cylindrical rolling surfaces with their inner drivers 11 on lower abutment surfaces 22 of the bearing blocks 7. The push cap 2 lies near the cylindrical rolling surfaces on the lever 5, 6 with upper abutment surfaces 23 on the outer drivers 11 of the levers 5, 6. The inner and outer drivers 11 are present on all cylindrical running surfaces of the construction. The weights 10 are selected and positioned such that the weight of the push cap 2 is compensated via the levers 5, 6 and the system is nearly in equilibrium. The center of gravity 21 in the Z-direction should in this case be approximately in the center of the levers 5, 6.

Figure 10:
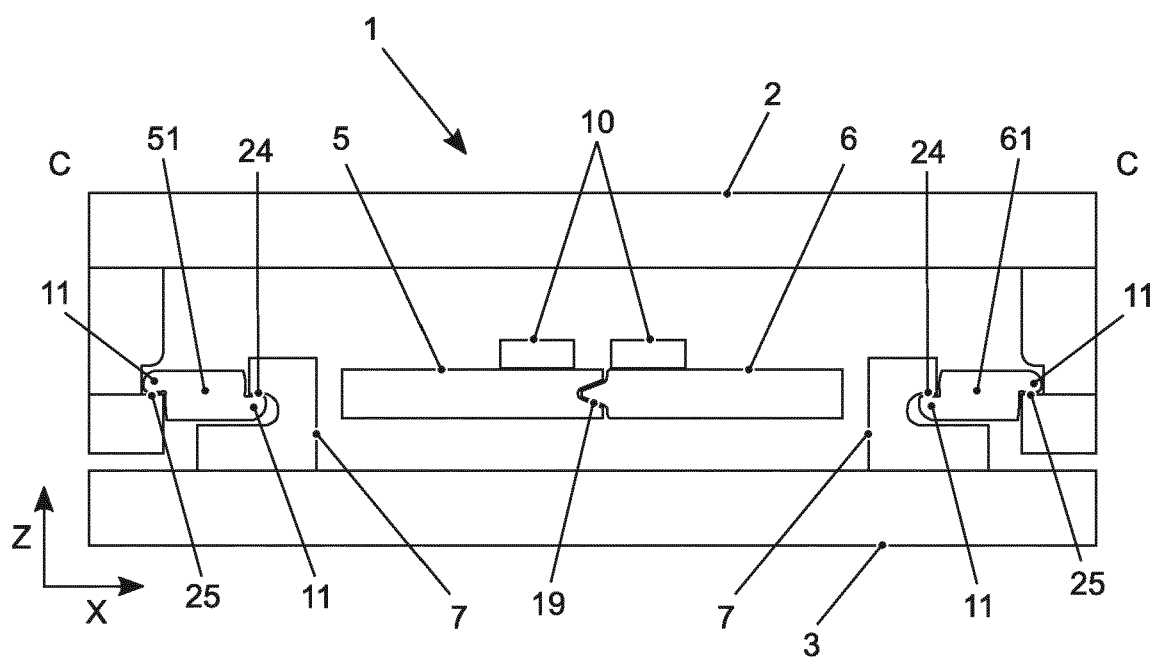
FIG. 10 shows a third section through the push switch from FIG. 7 along the X-Z plane.

FIG. 10 shows a third section through the push switch 1 from FIG. 7 along the X-Z plane in the region of the sectional plane C-C. In the representation shown, the section runs approximately through the rear third of the front bearing blocks 7. Near the cylindrical rolling surfaces, the inner drivers 11 of the levers 5, 6 hook under upper abutment surfaces 24 of the bearing blocks 7. Near the cylindrical rolling surfaces, the outer drivers 11 of the levers 5, 6 lie on lower abutment surfaces 25 of the push cap 2. The inner and outer drivers 11 are present on all cylindrical running surfaces of the construction. In comparison to the section B-B shown in FIG. 9, the drivers 11 here engage exactly oppositely.

Figure 11:
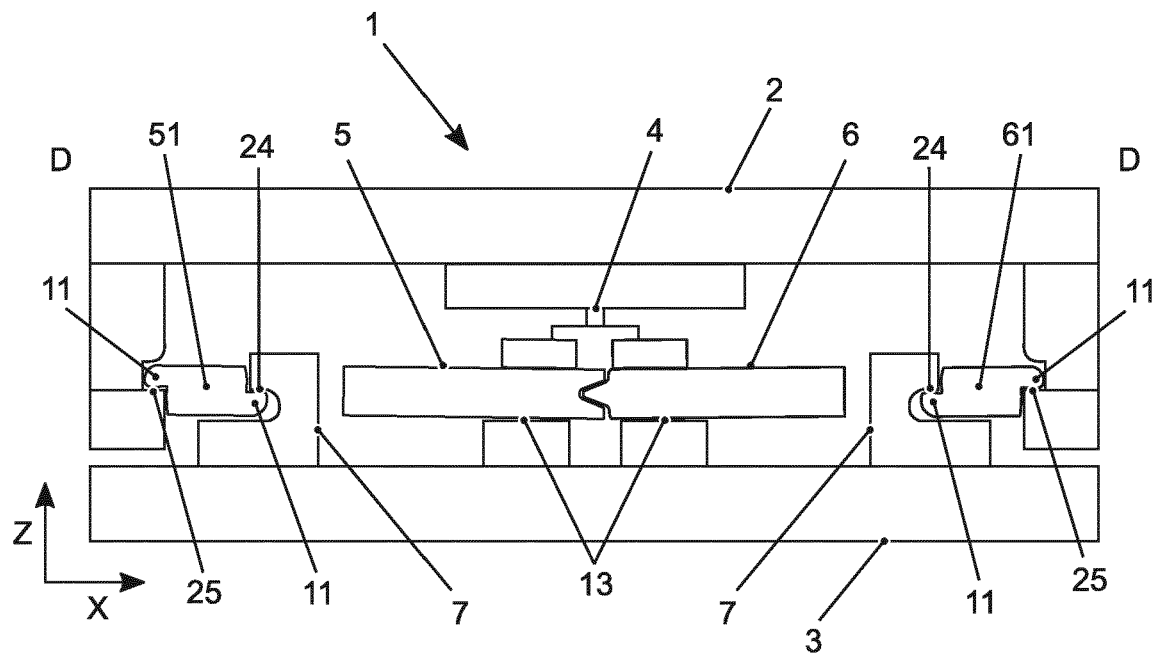
FIG. 11 shows a fourth section through the push switch from FIG. 7 along the X-Z plane in a resting position.

FIG. 11 shows a fourth section through the push switch 1 from FIG. 7 along the X-Z plane in the region of the sectional plane D-D. In the representation shown, the section runs through the center of the switch element 4. The push switch 1 is shown in a resting position. Near the cylindrical rolling surfaces, the inner drivers 11 of the levers 5, 6 hook under upper abutment surfaces 24 of the bearing blocks 7. Near the cylindrical rolling surfaces, the outer drivers 11 of the levers 5, 6 lie on lower abutment surfaces 25 of the push cap 2. The push cap 2 rests on the levers 5, 6. The levers 5, 6 do not lie exactly horizontal, but at an angle of approx. −1°. They lie on the carrier surfaces 13. The silicone of the switch element 4 is compressed by 0.1 mm, as a result of which the system is pretensioned.

Figure 12:
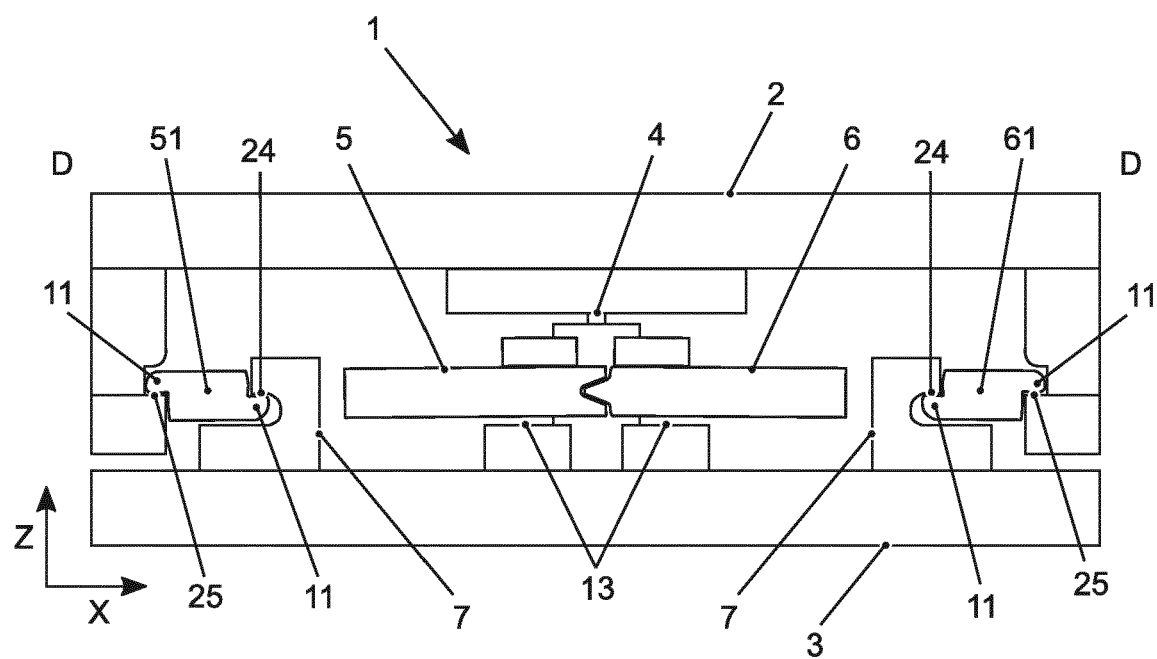
FIG. 12 shows the fourth section through the push switch from FIG. 7 along the X-Z plane in an actuation position.

FIG. 12 shows the fourth section through the push switch 1 from FIG. 7 along the X-Z plane in an actuation position. The push cap has been pressed and moved 0.5 mm in the direction of the baseplate 3. The long lever arms 52, 62 have moved in the direction of the push cap 2. The push cap has been guided nearly parallel by the levers 5, 6. In the actuation position, the levers 5, 6 also do not lie horizontal, but at an angle of approx. 1°. During the actuation, the silicone of the switch element 4 is compressed between the push cap 2 and the support surface 18 of the baseplate 3 by approx. 0.5 mm. The dome in the switch collapses in the process.

When the pressure on the push cap 2 lessens, the silicone relaxes again and the dome switch springs back to its starting position. Therefore, no additional spring is necessary to reset the push cap 2. The mass compensation by the levers 5, 6 and the weights 10, which compensates for the weight of the push cap, and the rolling design of the cylinder elements on the levers 5, 6, which considerably reduce the friction in the system, are primarily responsible for this.

Figure 13:
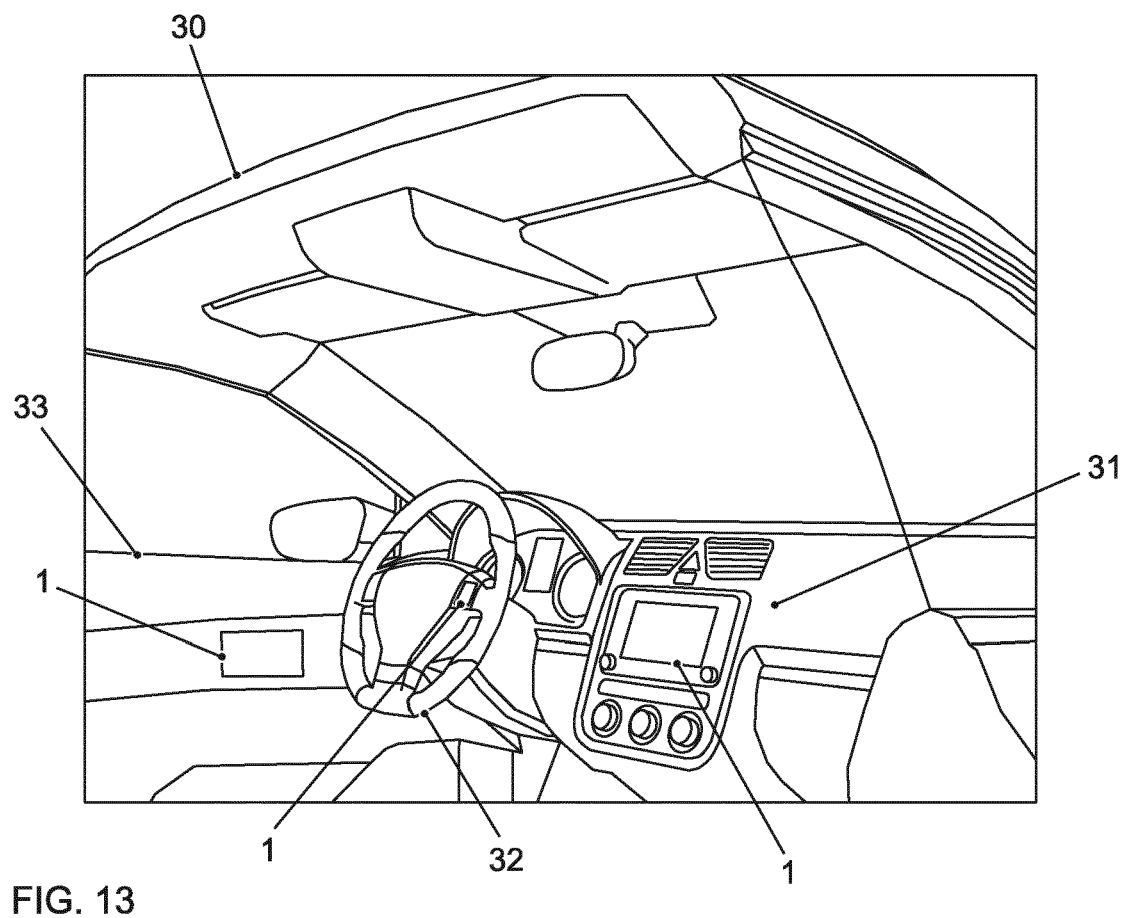
FIG. 13 schematically shows an embodiment of an interior of a motor vehicle in which push switches are installed.

FIG. 13 schematically shows an interior of a motor vehicle 30, in which push switches 1 according to the present teaching are installed. A first push switch 1 with display 14 is arranged in a dashboard 31 of the motor vehicle 30, for example to operate an infotainment system. Another considerably smaller push switch 1 is installed in the steering wheel 32. With its assistance, the operation, for example, of a hands-free apparatus or the control of a cruise control system can take place. A third push switch 1 is arranged in the door 33 of the driver's side. With this push switch 1, the opening of the door 33, for example, can be initiated, wherein a note can be displayed as necessary on a display of the push switch 1 if the adjacent traffic presents a hazardous situation.

LIST OF REFERENCE NUMERALS

1 Push switch
2 Push cap
2' Push cap attachment
3 Base plate
4 Switch element
5 First lever
6 Second lever
7 Bearing block
8 First lever end
9 Second lever end
10 Weight
11 Driver
12 Recess
13 Carrier surface
14 Display
15 Contact surface
16 Contact surface
17 Cylinder element
18 Support surface
19 Teeth
20 Opening
21 Center of gravity
22 Lower abutment surface
23 Upper abutment surface
24 Upper abutment surface
25 Lower abutment surface
30 Motor vehicle
31 Dashboard 32 Steering wheel
33 Door
51 Short lever arm
52 Long lever arm
61 Short lever arm
62 Long lever arm The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A push switch with a push cap, a baseplate, a switch element which is actuatable by the push cap, a first lever, and a second lever, wherein the first lever and the second lever are mounted rotatably on the baseplate by bearing blocks, are each connected movably to the push cap at a first lever end, and are connected movably to one another at a second lever end, and wherein the first lever and the second lever comprise one or more counterweights as mass compensation for the push cap, which counterweights are connected to the first and second levers and are positioned such that the weight of the push cap is compensated and the push switch is substantially in equilibrium.

2. The push switch of claim 1, wherein the bearing blocks are arranged such that the levers each have asymmetrical lever arms.

3. The push switch of claim 1, wherein the one or more counterweights comprise weights that are arranged in or on the levers and/or the one or more counterweights comprise an accumulation of material formed integrally with the first and second levers.

4. The push switch of claim 1, wherein the levers are designed such that their respective centers of gravity are shifted in the direction of the second lever end.

5. The push switch of claim 1, wherein the first lever end of the first lever and the first lever end of the second lever are connected to the push cap in a play-free manner in the direction of actuation of the push switch.

6. The push switch of claim 1, wherein the second lever end of the first lever and the second lever end of the second lever are connected to one another by involute toothing.

7. The push switch of claim 1, wherein contact surfaces between the levers and the push cap and between the levers and the bearing blocks are designed at least partially as cylindrical rolling surfaces.

8. The push switch of claim 1, wherein the levers each have at least one driver which hooks into an associated recess in the push cap or in the bearing blocks.

9. The push switch of claim 1, wherein the baseplate has a carrier surface for the levers which determines a resting position.

10. The push switch of claim 1, wherein a display is arranged on the push cap.

11. A motor vehicle, wherein the motor vehicle has the push switch of claim 1.

12. The push switch of claim 2, wherein the levers are designed such that their respective centers of gravity are shifted in the direction of the second lever end.

13. The push switch of claim 3, wherein the levers are designed such that their respective centers of gravity are shifted in the direction of the second lever end.

14. The push switch of claim 2, wherein the first lever end of the first lever and the first lever end of the second lever are connected to the push cap in a play-free manner in the direction of actuation of the push switch.

15. The push switch of claim 3, wherein the first lever end of the first lever and the first lever end of the second lever are connected to the push cap in a play-free manner in the direction of actuation of the push switch.

16. The push switch of claim 4, wherein the first lever end of the first lever and the first lever end of the second lever are connected to the push cap in a play-free manner in the direction of actuation of the push switch.

17. The push switch of claim 2, wherein the second lever end of the first lever and the second lever end of the second lever are connected to one another by involute toothing.

18. The push switch of claim 3, wherein the second lever end of the first lever and the second lever end of the second lever are connected to one another by involute toothing.

19. The push switch of claim 4, wherein the second lever end of the first lever and the second lever end of the second lever are connected to one another by involute toothing.

20. The push switch of claim 1, wherein the one or more counterweights are arranged with respect to the first and second lever so that a movement of the push cap in a first direction results in a movement of the weights in a second direction, opposite to the first direction.

* * * * *